United States Patent
Lee

(10) Patent No.: US 10,124,418 B2
(45) Date of Patent: Nov. 13, 2018

(54) AUTOMATIC MOVABLE MACHINE FOR CHAMFERING PIPE AND METAL SHEET

(71) Applicant: Jongil Lee, Daejeon (KR)

(72) Inventor: Jongil Lee, Daejeon (KR)

(73) Assignee: Jongil Lee, Daejeon (KR)

( * ) Notice: Subject to any disclaimer, the term of this patent is extended or adjusted under 35 U.S.C. 154(b) by 0 days.

(21) Appl. No.: 15/715,630

(22) Filed: Sep. 26, 2017

(65) Prior Publication Data
US 2018/0015552 A1   Jan. 18, 2018

Related U.S. Application Data

(63) Continuation of application No. PCT/KR2016/007561, filed on Jul. 12, 2016.

(30) Foreign Application Priority Data

Jul. 29, 2015   (KR) ........................ 10-2015-0107448

(51) Int. Cl.
*B23C 3/12*   (2006.01)
*B23C 1/20*   (2006.01)
(Continued)

(52) U.S. Cl.
CPC .................. *B23C 3/12* (2013.01); *B23C 1/20* (2013.01); *B23B 5/161* (2013.01); *B23B 5/168* (2013.01);
(Continued)

(58) Field of Classification Search
CPC ......... B23C 1/20; B23C 2220/16; B23C 3/12; B23K 37/00; B23B 5/16; B23B 5/168; B23B 5/167; B23B 5/161; B23B 2220/04
See application file for complete search history.

(56) References Cited

U.S. PATENT DOCUMENTS 2,188,584 A * 1/1940 Tyne ...................... B23B 5/167
                                                    144/241
3,699,828 A * 10/1972 Piatek ..................... B23B 5/16
                                                    144/205
(Continued)

FOREIGN PATENT DOCUMENTS

GB          2245516 A  *  1/1992  ............. B23B 5/168
JP       2014-014888 A      1/2014
(Continued)

OTHER PUBLICATIONS

International Search Report with Written Opinion of the International Searching Authority for corresponding International Patent Application No. PCT/KR2016/007561 dated Oct. 13, 2016, with English translation.

*Primary Examiner* — Sara Addisu
(74) *Attorney, Agent, or Firm* — Myers Wolin, LLC.

(57) ABSTRACT

An automatic movable machine includes a vertical plate and a support plate are fixed, in a perpendicular direction to each other, to a semicircular chamfering angle adjusting plate fixed to a head of the movable chamfering machined, a moving body is provided at the vertical plate on the inside of the pipe or the lower side of the metal sheet, and equipped with an internal roller regulated by a spring contact with the inside of the pipe or the lower side of the metal sheet, the support plate has a fixing bolt, a fixing plate is provided to the support plate, and provided at the front of a gear box, and external rollers are provided at the front of the gear box, and allow the speed of the rotational force of a motor, to be reduced in the gear box and transmit the speed-reduced rotational force.

2 Claims, 9 Drawing Sheets

(51) Int. Cl.
    *B23K 37/00*    (2006.01)
    *B23B 5/16*    (2006.01)

(52) U.S. Cl.
    CPC ....... *B23B 2220/04* (2013.01); *B23C 2220/16* (2013.01); *B23K 37/00* (2013.01)

(56) References Cited

U.S. PATENT DOCUMENTS

| | | | | |
|---|---|---|---|---|
| 3,712,174 | A * | 1/1973 | Granfield | B23B 5/16 409/138 |
| 3,817,649 | A * | 6/1974 | Medney | B23B 5/168 144/205 |
| 4,180,358 | A * | 12/1979 | Uribe | B23B 5/16 409/179 |
| 4,768,903 | A * | 9/1988 | Merritt, Jr. | B23Q 9/0028 142/32 |
| 5,641,253 | A * | 6/1997 | Wagner | B23B 5/168 409/179 |
| 6,146,067 | A * | 11/2000 | Owens | B23B 5/168 30/122 |
| 6,875,094 | B2 * | 4/2005 | Caporusso | B24B 9/007 451/296 |
| 8,297,157 | B1 * | 10/2012 | Miller | B23C 3/007 408/211 |
| 2004/0206218 | A1 * | 10/2004 | Nybo | B23B 5/168 82/113 |
| 2006/0225545 | A1 * | 10/2006 | Nolan | B23C 1/20 83/13 |
| 2012/0039682 | A1 * | 2/2012 | Jeon | B23C 3/122 409/138 |
| 2013/0216322 | A1 * | 8/2013 | Engrand | B23B 29/14 409/131 |
| 2015/0258613 | A1 * | 9/2015 | Choi | B23C 1/20 82/1.11 |
| 2016/0207114 | A1 | 7/2016 | Lee | |
| 2018/0015552 | A1 * | 1/2018 | Lee | B23C 3/12 |

FOREIGN PATENT DOCUMENTS

| | | | |
|---|---|---|---|
| KR | 10-0773320 B1 | 11/2007 | |
| KR | 10-1063951 B1 | 9/2011 | |
| KR | 10-2013-0107846 A | 10/2013 | |
| KR | 10-1497638 B1 | 3/2015 | |
| KR | 101497638 B1 * | 3/2015 | ............ B23B 5/161 |

* cited by examiner

AUTOMATIC MOVABLE MACHINE FOR CHAMFERING PIPE AND METAL SHEET

CROSS-REFERENCE

The present application is a continuation of international patent application No. PCT/KR2016/007561 filed on Jul. 12, 2016 and claims priority to Korean Patent Application No. 10-2015-0107448 filed Jul. 29, 2015 of which the contents of each are incorporated herein by reference in their entirety.

TECHNICAL FIELD

The present invention relates to an automatic movable machine for chamfering a pipe and a metal sheet, which can automatically cut edge portions of a pipe and a metal sheet so as to weld the cut pipe and the cut metal sheet.

BACKGROUND ART

For the welding of pipes, the cutting surfaces of the pipes have to be chamfered. However, the work of chamfering pipes cut at the bottom can be easily performed by engaging the pipes with a conventional chamfering apparatus, but the chamfering of the cutting surfaces of pipes that have been already installed, in the course of performing piping work, is very difficult That is, during plant piping work, pipes with various diameters are placed in elevated places. Therefore, the chamfering of the pipes using a tool such as a portable grinder does not provide regular chamfered angles and is difficult because it is performed while rotating the grinder along the cutting surface of the pipes. Also, since the pipes are chamfered in elevated places, the work environment becomes poor.

In addition, when chamfering work is performed by installing a portable automatic chamfering apparatus on the cutting surfaces of pipes, chamfering apparatuses with various sizes should be provided for various diameters of pipes, and then a chamfering apparatus suitable for the diameter of pipes to be chamfered must be selected and used. Thus, the chamfering of the cutting surfaces of pipes during plant work using a pipe chamfering apparatus may be difficult.

In order to solve these problems, a portable pipe outer diameter-chamfering apparatus with an improved weldability has been suggested by Korean Patent No. 10-1497638 (issued on Feb. 24, 2015), in which circumscribing rollers are installed on the outside of a pipe to be a predetermined distance apart, an inscribing roller is installed on the inside of the pipe at a lower central part of the circumscribing rollers, the inscribing roller and the circumscribing rollers are closely adhered to the inside and the outside of the pipe, and then the pipe is chamfered with a cutting blade. The patented chamfering apparatus is moved manually, which is not problematic for pipes with a small diameter. However, in the case of pipes with a large diameter, it may not be easy to rotate the patented chamfering apparatus along the cutting surfaces of the pipes. Also, in the case of pipes having a large diameter and formed of a rigid material, it takes a long time to chamfer the pipes, and as a result, the worker's work efficiency decreases.

PRIOR ART DOCUMENTS

Patent Publications (Patent Publication 1) Korean Patent No. 10-1497638 (issued on Feb. 24, 2015)

(Patent Publication 2) Korean Patent No. 10-1416221 (issued on Jul. 1, 2014)

(Patent Publication 3) Korean Patent No. 10-0988070 (issued on Oct. 8, 2010)

(Patent Publication 4) Korean Patent No. 10-1340571 (issued on Dec. 5, 2013)

DISCLOSURE

Technical Problems

In order to solve the problems that, in the case of manually chamfering the cutting surface of a pipe with a large diameter, the chamfering of the pipe in an elevated place is difficult and cannot be performed consecutively, the present invention provides automatically chamfering the cutting surface of a pipe with a large diameter so as to address the inconvenience of manual chamfering.

Technical Solutions

The present invention is configured such that: a vertical plate and a support plate are fixed, in a perpendicular direction to each other, to a semicircular chamfering angle adjusting plate fixed to a head of the movable chamfering machine; a moving body is provided at the vertical plate on the inside of the pipe or the bottom of the metal sheet, and equipped with an inscribing roller whose pressing force is regulated by a spring and which is closely adhered to the inside of the pipe or the bottom of the metal sheet; the support plate has a fixing bolt provided at the center thereof and guides provided on both sides thereof; a fixing plate to which the fixing bolt and the guides are inserted and coupled is provided on the support plate, and fixedly installed at the front of a gear box; and circumscribing rollers, which are closely adhered to the outside of the pipe or the top of the metal sheet on the left and right sides of the fixing plate, are provided at the front of the gear box and allow a rotational force of a motor, which is provided at the rear side of the gear box, to be decelerated in the gear box and then to be transmitted; and the cutting surface of the pipe is chamfered by installing the chamfering apparatus in such a manner that the inscribing roller can be closely adhered to an upper part of the inside of the pipe and then the circumscribing rollers can be closely adhered to the outside of the pipe, and pressing the fixing plate against the fixing bolt so that the chamfering apparatus can move along the cutting surface of the pipe with the use of the driving force of the circumscribing rollers in a state where the inscribing roller and the circumscribing rollers are closely adhered to the pipe.

In the present invention, the inscribing roller rotates in only one direction by the use of a one-way clutch, maintains a state of being closely adhered to the inside of the pipe due to the tension of a spring, and is slightly deviated from the central axis of the pipe so that the chamfering apparatus can rotate along the cutting surface of the pipe in a state where the cutting surface of the pipe is closely adhered to the chamfering apparatus.

According to the present invention, the outer edge of the cutting surface of the pipe is chamfered by the rotation of a knife-blade installed to protrude from a central edge portion between the vertical plate and the support plate; the chamfering apparatus performs the chamfering of the pipe while rotating along the pipe due to the inscribing roller and the circumscribing rollers, which are installed on the inside or the outside of the pipe in a central axial direction of the pipe; the height of the fixing plate, with which the guides installed on both sides of the support plate are engaged, varies depending on the diameter of the pipe; since the height of the fixing plate can be varied, the circumscribing rollers coupled to the fixing plate can be closely adhered to the pipe in accordance with a variation in the diameter of the pipe; by fastening a fixing nut to the fixing bolt at the center of the support plate, the circumscribing rollers are pressed against the pipe to rotate; and since the pipe can be automatically chamfered because of the inscribing roller and the circumscribing rollers being able to be closely adhered thereto, even if the pipe is almost flat because of too large a diameter thereof, a flat metal sheet can also be chamfered.

Advantageous Effects

The present invention relates to chamfering the cutting surface of a pipe or a metal sheet for welding, and particularly, to automatically chamfering the pipe and the metal sheet by closely adhering an inscribing roller to the inside of the pipe or the bottom of the metal sheet, closely adhering circumscribing rollers to the outside of the pipe or the top of the metal sheet, and applying a rotational force to the circumscribing rollers so that a chamfering apparatus can automatically move along the cutting surface of the pipe or the metal sheet. Accordingly, the present invention can be installed for pipes with various diameters and can automatically chamfer pipes with a large diameter, thereby providing convenience compared to manual chamfering.

That is, a pipe or a metal sheet can be automatically chamfered by mounting the chamfering apparatus on the cutting surface of the pipe or the metal sheet and applying a rotational force to the circumscribing rollers so that the chamfering apparatus can move along the cutting surface of the pipe or the metal sheet. Accordingly, the cutting surface of the pipe or the metal sheet can be automatically chamfered with ease.

MODES FOR CARRYING OUT THE INVENTION

Figure 1:
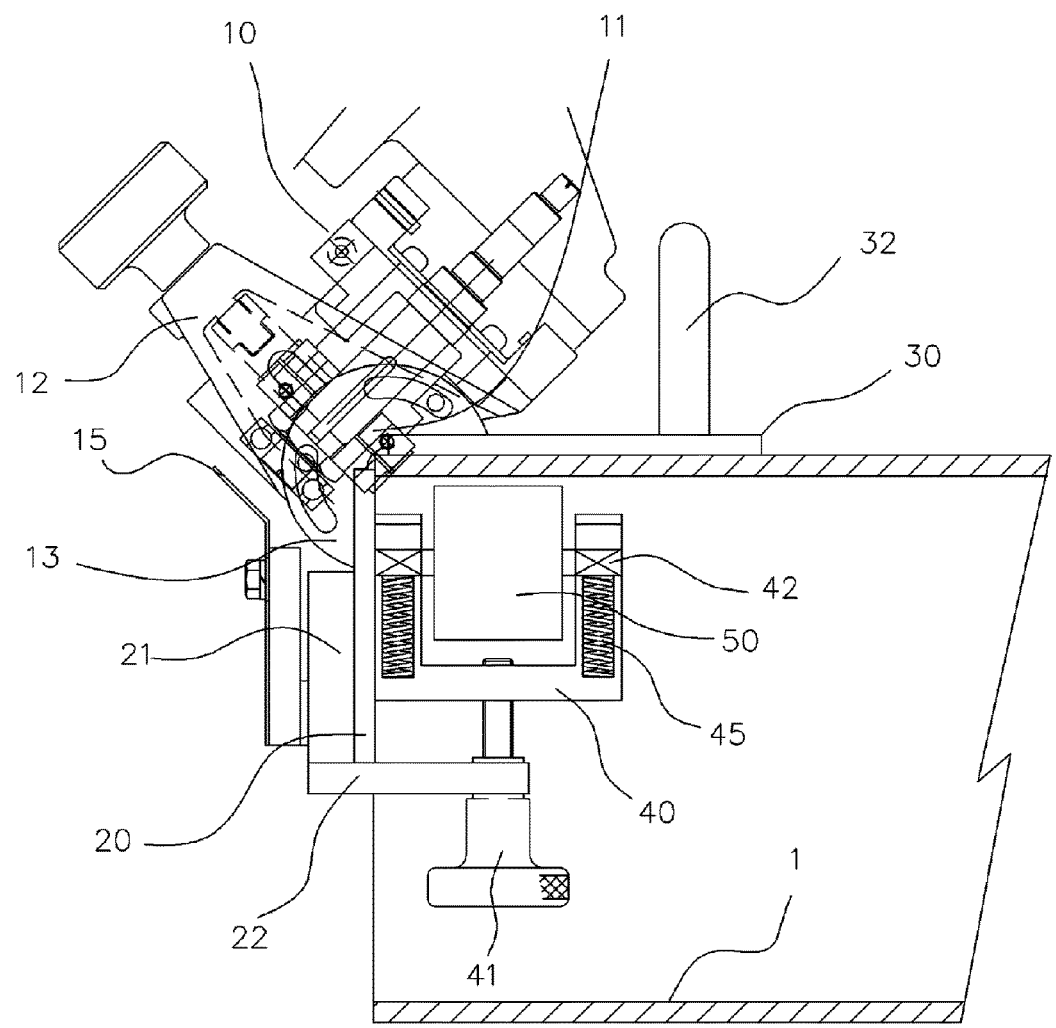
FIG. 1 is a side view of a chamfering apparatus with an inscribing roller installed therein in accordance with the present invention.
Figure 2:
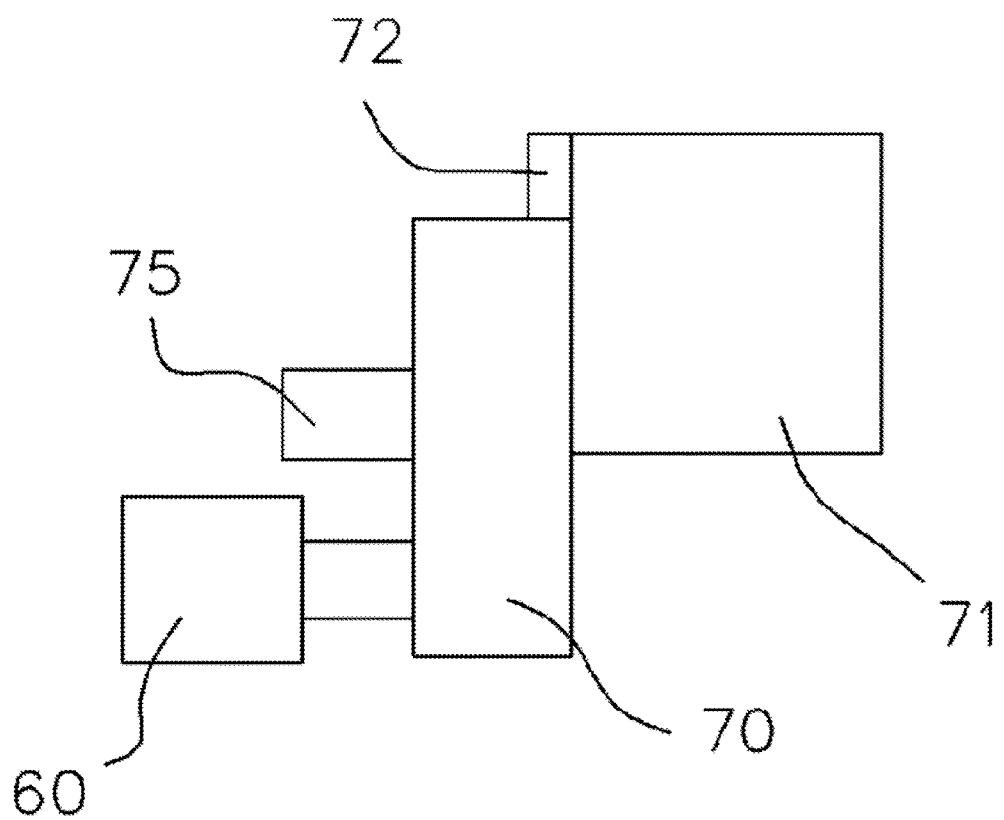
FIG. 2 is a side view of a gear box with circumscribing rollers installed thereon in accordance with the present invention.
Figure 3:
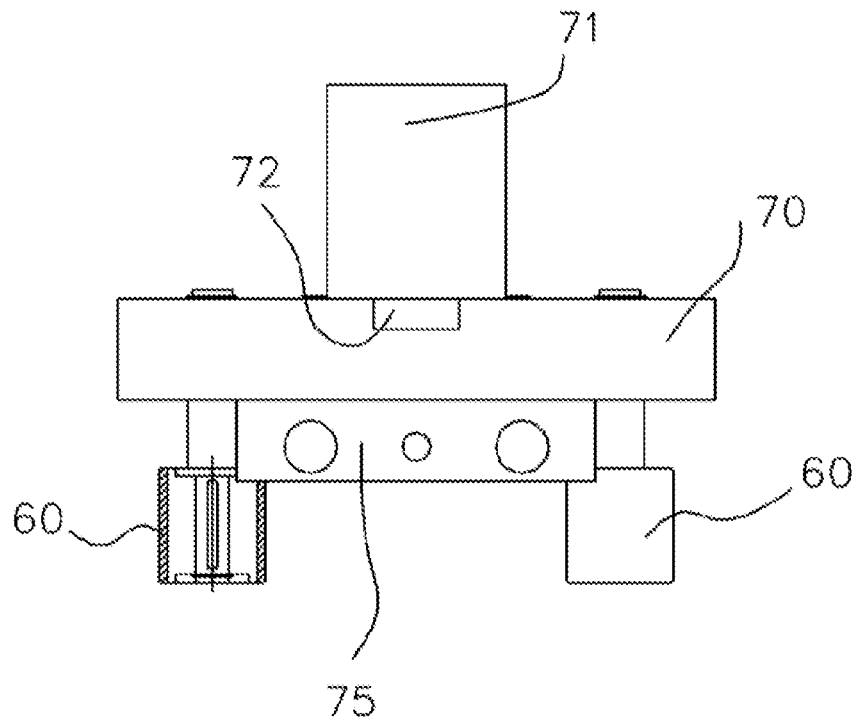
FIG. 3 is a plan view of the gear box with the circumscribing rollers installed thereon in accordance with the present invention.
Figure 4:
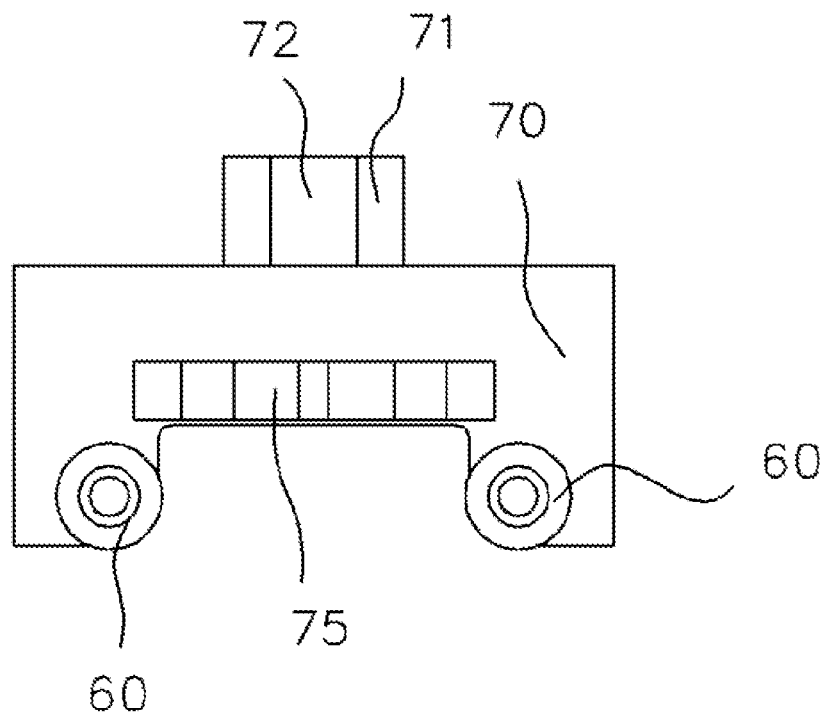
FIG. 4 is a front view of the gear box with the circumscribing rollers installed thereon in accordance with the present invention.
Figure 5:
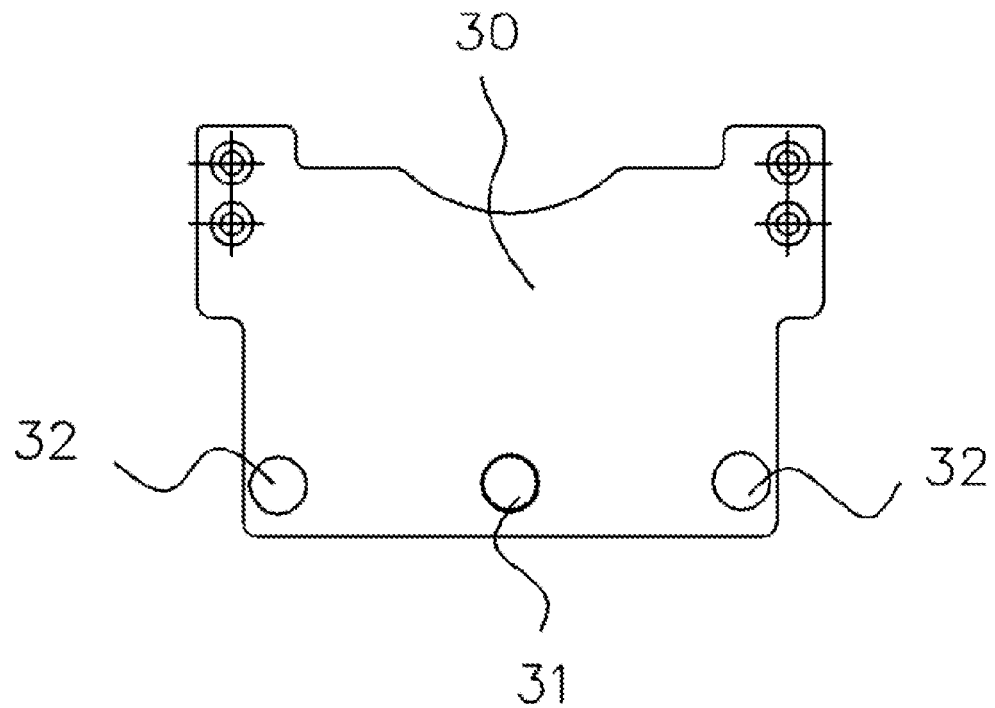
FIG. 5 is a plan view of a support plate fixed to a semicircular chamfering angle adjusting plate in accordance with the present invention.
Figure 6:
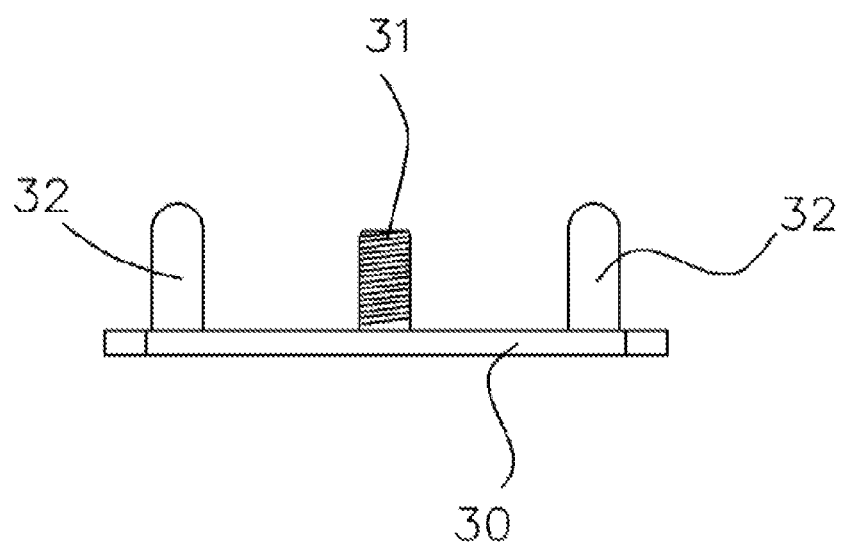
FIG. 6 is a front view of the support plate fixed to the semicircular chamfering angle adjusting plate in accordance with the present invention.
Figure 7:
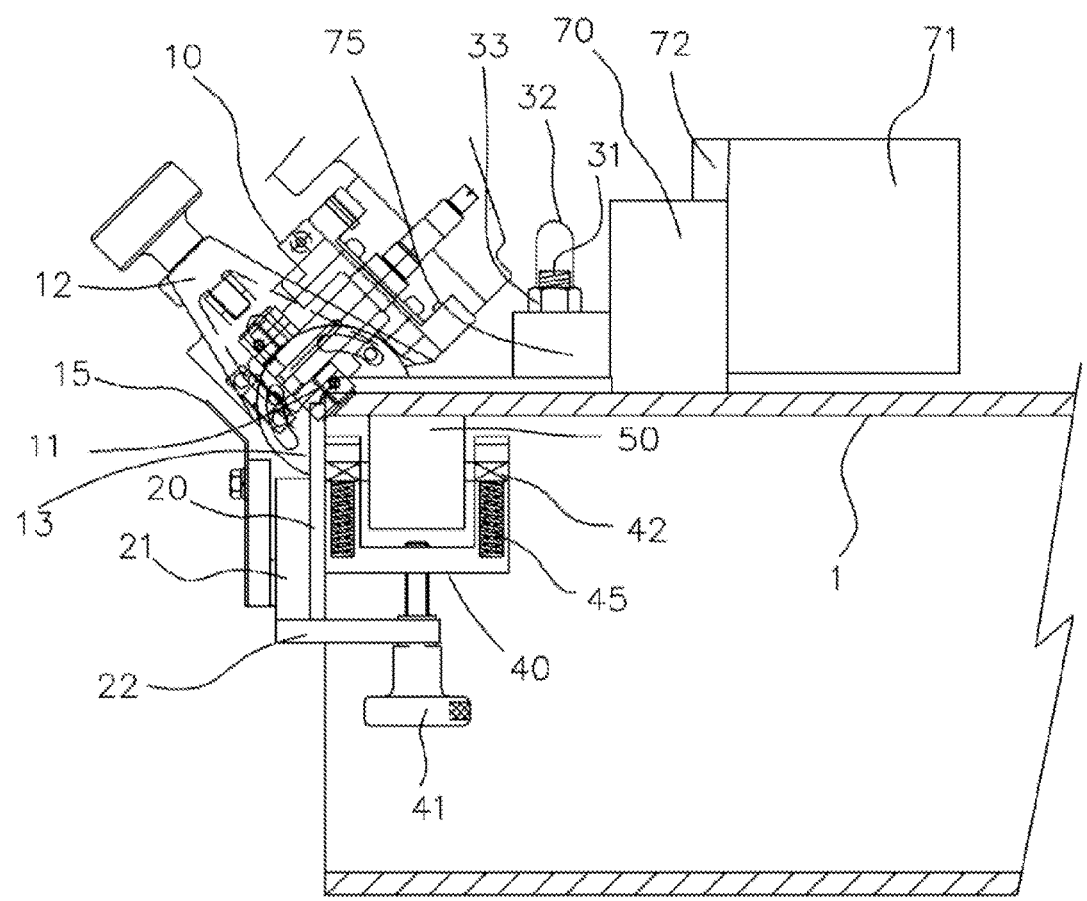
FIG. 7 is a lateral cross-sectional view illustrating a state of the present invention during use for a pipe.
Figure 8:
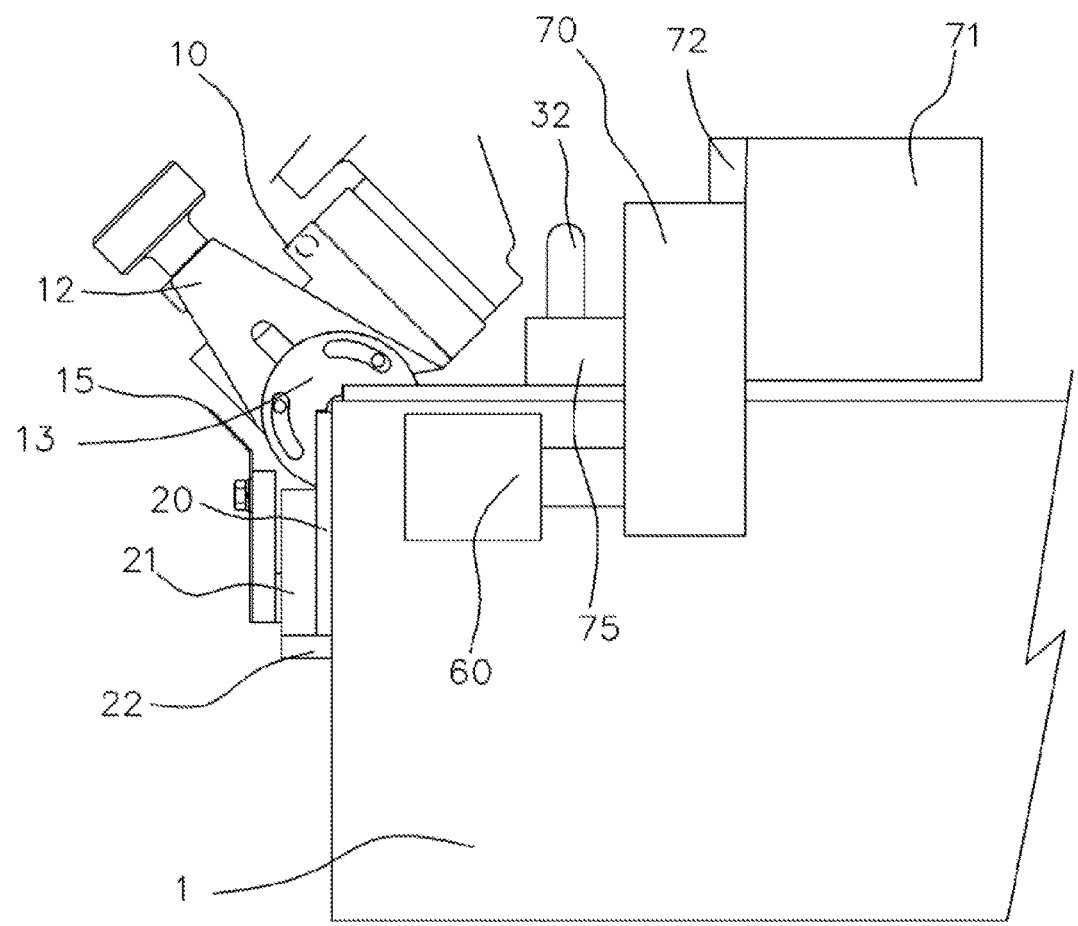
FIG. 8 is a side view illustrating the state of the present invention during use for the pipe.
Figure 9:
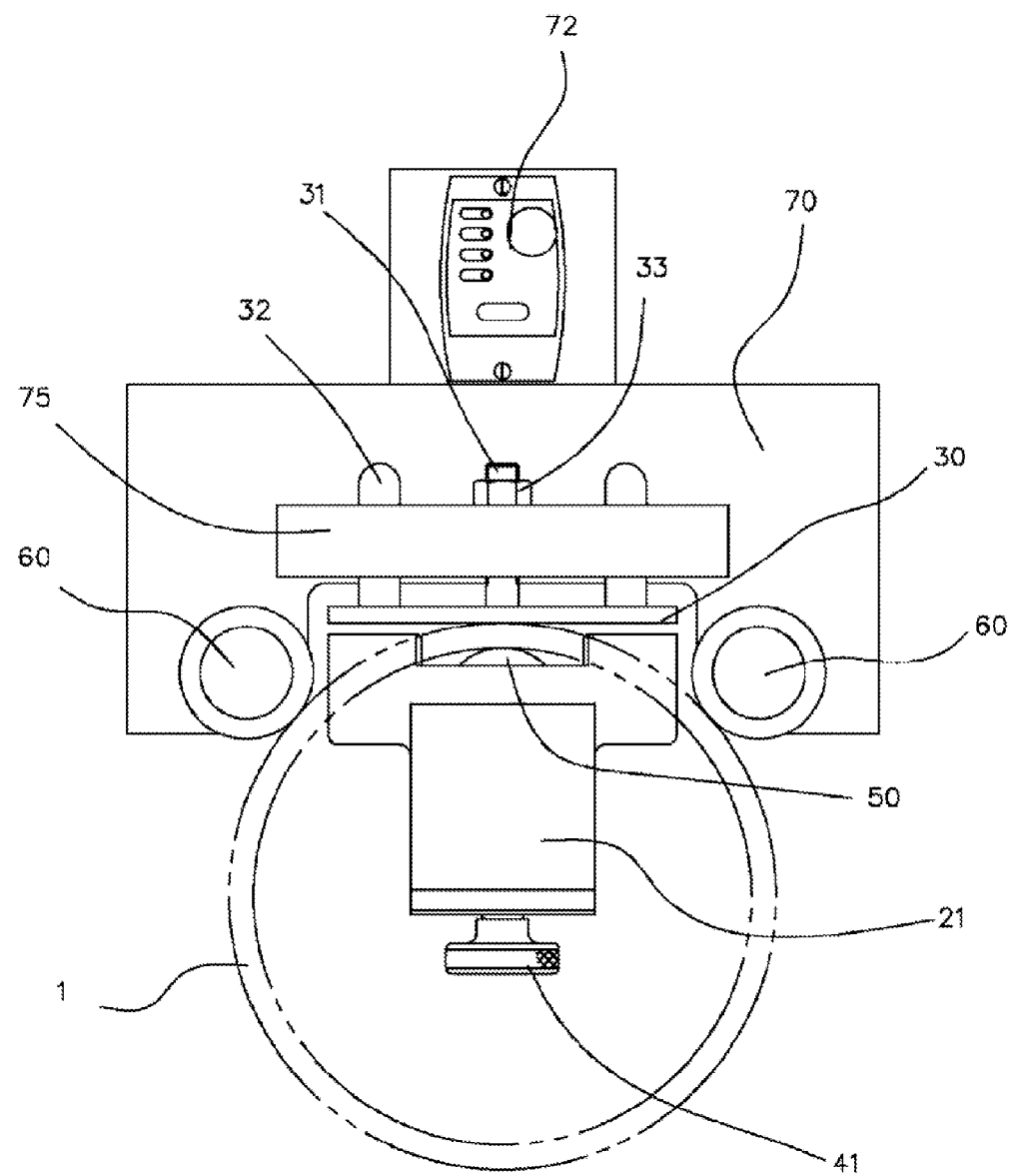
FIG. 9 is a front view illustrating the state of the present invention during use for the pipe.
Figure 10:
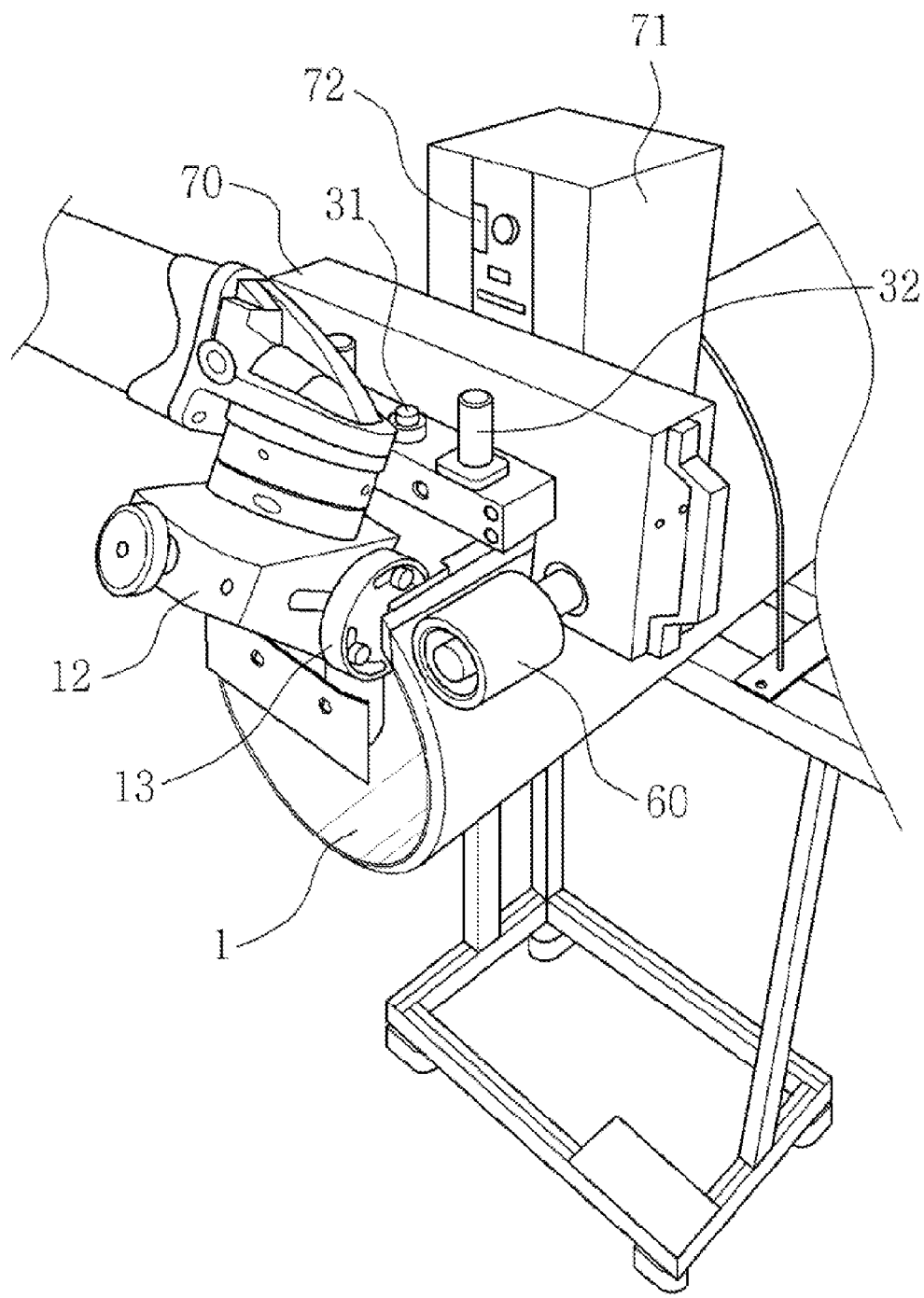
FIG. 10 is a view of an exemplary embodiment of the present invention.
Figure 11:
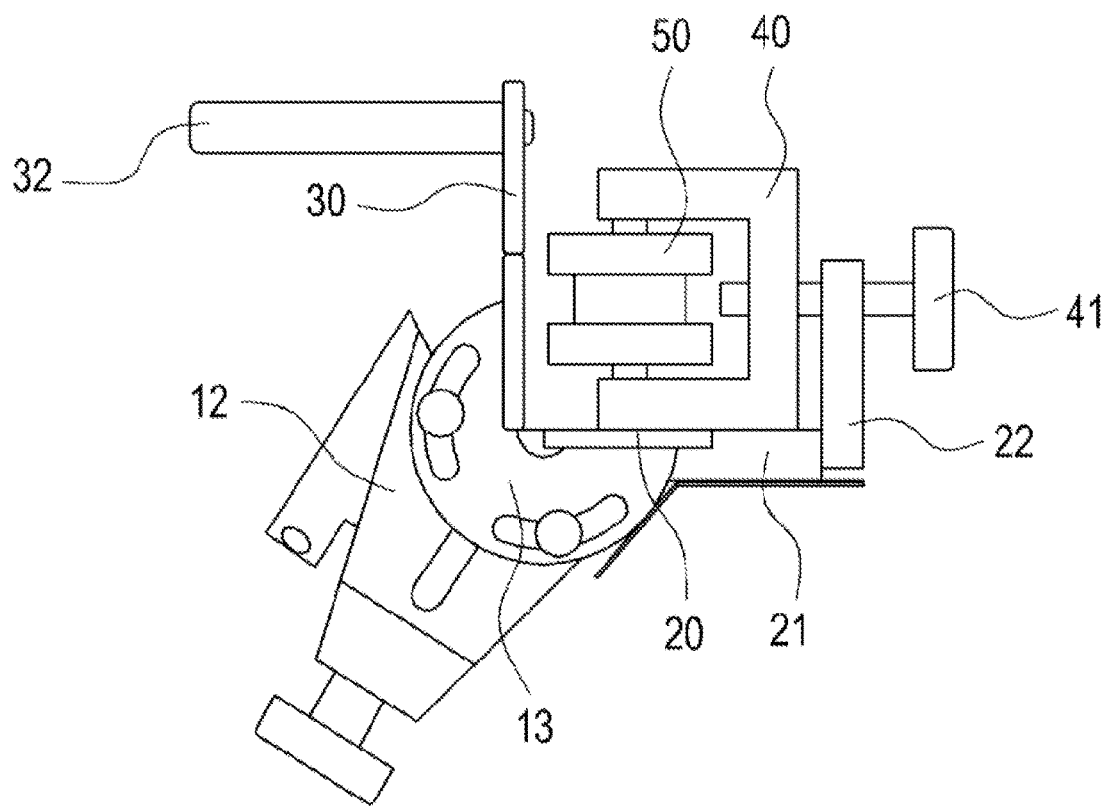
FIG. 11 is a side view of a chamfering apparatus with an inscribing roller installed therein in accordance with the present invention.

In the present invention, a chamfering apparatus equipped with an inscribing roller closely adhered to the inside of a pipe and a gear box equipped with circumscribing rollers closely adhered to the outside of the pipe are provided; the chamfering apparatus is installed on the cutting surface of the pipe, and then, the gear box is coupled and fixed; the cutting surface of the pipe or the metal sheet is chamfered with a knife-blade by closely adhering the inscribing roller to the inside of the pipe, closely adhering the circumscribing rollers to the outside of the pipe, and rotating the circumscribing rollers in the gear box so that the chamfering apparatus can move along the cutting surface of the pipe.

In the present invention, a vertical plate and a support plate are fixed, in a perpendicular direction to each other, to a semicircular chamfering angle adjusting plate fixed on both sides of a head of a portable chamfering apparatus, and the cutting surface of the pipe is chamfered with a knife-blade projected between the vertical plate and the support plate in a state where the cutting surface of the pipe is closely adhered to the vertical plate and the outside of the pipe is closely adhered to the support plate; the gear box is coupled to the support plate so that the circumscribing rollers projected from both sides of the front of the gear box can be closely adhered to left and right sides of the outside of the pipe, and that the inscribing roller of a moving body coupled to the vertical plate can be closely adhered to the inside of the pipe; and then by driving the circumscribing rollers, the portable chamfering apparatus is allowed to move along the cutting surface of the pipe and to automatically chamfer the cutting surface of the pipe with the knife-blade.

The circumscribing rollers of the present invention are installed below the support plate to be spaced apart from each other; the inscribing roller is installed at the moving body to be located at a lower central portion of the support plate between the circumscribing rollers; automatic chamfering is performed with the two circumscribing rollers and the inscribing roller closely adhered to the inside and the outside of the pipe; the circumscribing rollers of the present invention are wrapped with a urethane material so as to increase the friction when the chamfering apparatus moves along the pipe; and the inscribing roller of the present invention is slightly deviated from the central axis of the pipe so that the chamfering apparatus can be pulled toward the pipe due to the inclination angle of the inscribing roller and can thus move along the pipe in a state of being closely adhered to the cutting surface of the pipe.

In the vertical plate of the present invention, a vertical fixing plate is fixed, and a horizontal fixing plate is installed at the end of the vertical fixing plate to face the pipe; the moving body is installed above the horizontal fixing plate so as to be height-adjustable by an inscribing roller adjustment screw installed on the horizontal fixing plate; the inscribing roller is installed in the moving body in such a manner that a roller shaft of the inscribing roller can receive a pressing force in a direction that pushes away the inscribing roller with a spring inside the moving body, and as a result, the inscribing roller can be moved by the inscribing roller adjustment screw and can be closely adhered to the inside of the pipe; and the inscribing roller can be further closely adhered to the inside of the pipe by the spring.

That is, the inscribing roller can be elevated or lowered by the inscribing roller adjustment screw; when elevated, the inscribing roller is closely adhered to the inside of the pipe; if the inscribing roller adjustment screw is further rotated in this state, the spring is pressed, and as a result, chamfering can be performed in a state where the inscribing roller is closely adhered to the pipe or a steel plate; and since the central axis of the inscribing roller is shifted, the chamfering apparatus can automatically chamfer the cutting surface of the pipe in a state of being closely adhered to the cutting surface of the pipe and rotating along a circumferential direction of the pipe.

The support plate of the present invention is installed in such a manner that one side thereof is fixed to the semicircular chamfering angle adjusting plate and a fixing bolt is installed on the other side thereof; guides are formed to protrude on both sides of the support plate; the fixing bolt and the guides are inserted into holes formed on the fixing plate projected forward from, and fixed to, the gear box; and after engaging the fixing bolt and the guides with the fixing plate, a fixing nut is coupled to the fixing bolt.

A motor is provided at the rear of the gear box of the present invention; a control panel for controlling speed is formed in the gear box; the circumscribing rollers are installed to protrude from both sides of the front of the gear box; the gear box is fixed in a state where the circumscribing rollers are closely adhered to the outside of the pipe; in the gear box, the rotational force of the motor is decelerated by a gear arrangement, installed in the gear box, to rotate the circumscribing rollers; and the control panel adjusts the rotational speed of the circumscribing rollers.

Here, the circumscribing rollers are installed on parts of the outside of the pipe that are on both sides of the support plate and below the support plate; the inscribing roller is installed on the inside of the pipe below the support plate; and a scattering prevention plate is installed on the outside of the vertical fixing plate so that chips generated during chamfering can be prevented from being scattered to the worker.

In the present invention, the knife-blade projected between the vertical plate and the support plate chamfers the outside of the cutting surface of the pipe in a state where the inscribing roller is closely adhered to the inside of the pipe and the circumscribing rollers are closely adhered to the outside of the pipe; and chamfering is performed while the chamfering apparatus is rotating along the cutting surface of the pipe due to the rotational force of the circumscribing rollers, in which case, the chamfering apparatus rotates in only one direction because of the one-way clutch installed at the inscribing roller and the rotational force and the rotational direction of the motor, applied to the circumscribing rollers during the chamfering.

Here, the inscribing roller can be elevated or lowered by the inscribing roller adjustment screw; when elevated, the inscribing roller is closely adhered to the inner surface of the pipe; and if the inscribing roller adjustment screw is further rotated in this state, the spring is pressed to push a press roller to the steel plate closely, and as a result, the inscribing roller can move precisely along a circumferential direction of the pipe during pipe chamfering and can perform the chamfering of the cutting surface of the pipe.

An exemplary embodiment of the present invention will hereinafter be described in detail with reference to the accompanying drawings.

A chamfering apparatus 10 of the present invention comprises a head 12 for rotating a knife-blade 11 using a rotating force transferred from the motor driving unit, a vertical plate 20 and a support plate 30 coupled to a semicircular chamfering angle adjusting plate 13 are installed on the head 12 in orthogonal directions, and a knife-blade 11 projected between the vertical plate 20 and the support plate 30 chamfers a cutting surface of a pipe 1. The configuration of the vertical plate 20 fixed to the head 12 and the chamfering feature performed by a rotation of the knife-blade 11 are well known in the art, and thus the detailed descriptions thereof will be omitted.

In the present invention, the inscribing roller 50, which moves up and down and is closely adhered to the inside of the pipe 1, is provided in the circumscribing apparatus 10; the gear box 70, which rotates the circumscribing rollers 60 with the rotational force of the motor 71, is coupled to the circumscribing apparatus 10; and if the circumscribing rollers 60, which protrude from both sides of the front of the gear box 70, are closely adhered to the outside of the pipe 1 and the circumscribing rollers 60 are rotated by the rotational force of the motor 71, the circumscribing apparatus 10 travels along the cutting surface of the pipe 1, and as a result, the cutting surface of the pipe 1 is automatically chamfered.

In the present invention, the vertical fixing plate 21 is fixed to the outside of the vertical plate 20; the horizontal fixing plate 22 is fixed in a perpendicular direction to the vertical fixing plate 21; the moving body 40 is installed above the horizontal fixing plate 22 so as to be vertically movable in accordance with the rotation of the inscribing roller adjustment screw 41, which is engaged with the horizontal plate 22; the inscribing roller 50 with the one-way clutch embedded therein is installed at the moving body 40 so as to be elastically supported by a spring 45; and as a result, if the inscribing roller adjustment screw 41 is further rotated with the inscribing roller 50 closely adhered to the inside of the pipe 1, the inscribing roller 50 is closely adhered to the spring 45 and is thus closely adhered to the inside of the pipe 1, thereby ensuring the adhesion of the inscribing roller 50.

A fixing bolt 31 is projected at the center of the support plate 30, which is fixed to the semicircular chamfering angle adjusting plate 13 of the present invention, and guides 32 are projected from both sides of the fixing bolt 31, and a fixing plate 75, which protrudes from the front surface of the gear box 70, is engaged with the fixing bolt 31 and the guides 32 and is fixed by a fixing nut 33.

The gear box 70 of the present invention rotates the circumscribed rollers 60 projected forward from both sides thereof by decelerating the rotational force of the motor 71 provided at the rear thereof with a gear arrangement, the driving and stopping, and the speed control of the motor 71 can be performed by a control panel 72, and a long fastening bolt 31 and long guides 32 can be selected and used depending on the diameter of the pipe 1 or as necessary, or when chamfering a flat metal sheet.

If the gear box 70 of the present invention is coupled to the chamfering apparatus 10, the circumscribing rollers 60 are closely adhered to the outside of the pipe 1 and rotate only in one direction due to a predefined motor direction and the gear arrangement, and the one-way clutch embedded in the inscribing roller 50 of the present invention makes the inscribing roller 50 rotate in only one direction, which is already well known in the art.

The moving body 40 has the same structure as the moving body disclosed in Korean Patent No. 10-1340571 by the present Applicant, and thus a detailed description thereof will be omitted.

The circumscribing rollers 60 and the inscribing roller 50 of the present invention are rotate in a state of being closely adhered to the outside and the inside, respectively, of the pipe 1, and thus simply travel along the cutting surface of the pipe 1 without moving in a longitudinal direction of the pipe 1, and since the central axis of the inscribing roller 50 of the present invention is slightly shifted so as for the inscribing roller 50 to be movable toward the inside of the pipe 1 when rotating on the pipe 1, the vertical plate 20 of the chamfering apparatus 10 can always be closely adhered to the cutting surface of the pipe 1 when the chamfering apparatus 10 is rotating on the pipe 1.

A scattering prevention plate 15 for shielding the side of the vertical plate 20 is installed on the head 12 to prevent chips generated during chamfering from being scattered to the worker.

According to the present invention having the above configuration, when the chamfering machine 10 is installed on the cutting surface of the pipe 1 and the motor 71 is driven, the chamfering machine 10 automatically performs chamfering while rotating on the pipe 1. The chamfering apparatus 10 is installed on the cutting surface of the pipe 1 when the chamfering apparatus 10 and the gear box 70 are yet to be coupled, the gear box 70 is coupled and fixed to the chamfering apparatus 1, and the chamfering apparatus 10 is rotated by use of the rotational force of the motor 71, thereby automatically performing chamfering on the cutting surface of the pipe 1.

First of all, the vertical plate 20 and the support plate 30 are fixed to the semicircular chamfering angle adjusting plate 13 of the chamfering apparatus 10, before the installation of the chamfering apparatus 10 on the cutting surface of the pipe 1, in such a manner that the fixing bolt 31 can be projected on the support plate 30 and the guides 32 can be projected on both sides of the fixing bolt 31. The gear box 70 is coupled and fixed, and the vertical fixing plate 21 and the horizontal fixing plate 22 are fixed to the vertical plate 20, and the moving body 40 is installed above the horizontal fixing plate 22 so as to be vertically movable by the inscribing roller adjustment screw 41.

The moving body 40 is vertically movable by the inscribing roller adjustment screw 41, a roller shaft 42 of the inscribing roller 50 is installed in a state of being pressed by the spring 45, and the inscribing roller 50 rotates in a circumferential direction in a state of being closely adhered to the inside of the pipe 1. If the inscribing roller adjustment screw 41 is further rotated in a state where the moving body 40 is elevated by rotating the inscribing roller adjustment screw 41 and is thus closely adhered to the inside of the pipe 1, the inscribing roller 40 can receive an elastic force by pressing the spring 45 and can maintain its state of being closely adhered to the inside of the pipe 1.

In this state, by inserting the fixing bolt 31 and the guides 32 into the holes formed on the fixing plate 75 projected forward from the gear box 70 and engaging the fixing nut 33 with the fixing bolt 31, the coupling of the gear box 70 is completed. The gear box 70 of the present invention is provided with the motor 71 and the control panel 72, which is for on/off and speed control, and can achieve a desired reduction gear ratio using the gear arrangement therein.

The circumscribing rollers 60 are installed at the gear box 70 to be projected forward from both sides of the gear box 70. The circumscribing rollers 60, which are rotated by the rotational force of the motor 70 decelerated by the gear box 70, are wrapped with a material such as urethane having an excellent friction force.

If the fixing nut 33 is tightened in a state where the circumscribing rollers 60 are closely adhered to the outside of the pipe 1 by engaging the gear box 70 of the present invention, the fixing bolt 31 of the support plate 30 is moved upwardly and pulled, and at the same time, the circumscribing rollers 60 are closely adhered to the outside of the pipe 1. By tightening the fixing nut 33, the bottom surface of the support plate 30 is separated while being closely adhered to the pipe 1, and instead, the circumscribing rollers 60 are closely adhered to the pipe 1.

If the motor 71 is driven when the gear box 70 is coupled to the chamfering apparatus 10 and is thus mounted on the cutting surface of the pipe 1, the rotational force of the motor 71 is reduced in the gear box 70 and then rotates the circumscribing rollers 60, and the circumscribing rollers 60, closely adhered to the outside of the pipe 1 by the rotation of the motor 71 in a state where the inscribing roller 50 is closely adhered to the inside of the pipe 1, rotate in one direction, and as a result, the chamfering apparatus 10 can perform chamfering while moving along the cutting surface of the pipe 1. Once the chamfering apparatus 10 rotates one turn, the chamfering of the cutting surface of the pipe 1 is completed. Then, the motor 71 is stopped, the gear box 70 is detached, and the chamfering apparatus 10 is detached to chamfer a new pipe 1.

Here, the central axis of the inscribing roller 50 is shifted so as to be able to pull the chamfering apparatus 10 in a direction away from the end of the pipe 1 when the chamfering apparatus 10 is moving on the pipe 1. Thus, the chamfering apparatus 10 can rotate with the vertical plate 20 closely adhered to the cutting surface of the pipe 1.

The present invention is also applicable to a pipe 1 having a large diameter or a linear metal sheet, especially when the fixing bolt 31 and the guides 32 are sufficiently elongated. In the above description, the outside of a pipe may be interpreted as corresponding to the top of a metal sheet, and the inside of a pipe may be interpreted as corresponding to the bottom of a metal sheet. When the tightening nut 33 is tightened, the support plate 30 is elevated to closely adhere the circumscribing rollers 60 to the pipe 1 and the metal sheet. Thus, the present invention can be installed and can perform chamfering on the pipe 1 without regard to the diameter of the pipe 1 and can also perform chamfering on the metal sheet.

In the present invention, the cutting surface of the pipe 1 or the metal sheet is chamfered using the motor 71 to allow the chamfering apparatus 10 to travel forward and automatically perform chamfering on the cutting surface of the pipe 1 and the metal sheet. By using the scattering prevention plate 15, chips generated during chamfering can be prevented from being scattered to the worker, and as a result, safety can be guaranteed during the work.

When the chamfering of the cut surfaces of the pipe 1 and the metal plate is completed, the motor 71 is stopped, the fixing nut 33 is untightened, and the gear box 70 is detached and lowered. Then, the inscribing roller adjustment screw 41 is rotated so as for the inscribing roller 50 to be no longer in contact with the inside of the pipe 1 or the bottom of the metal sheet, and the chamfering apparatus 10 is detached from the pipe 1 and the metal sheet and is lowered. Then, in reverse order of the above, the chamfering apparatus 10 is mounted on a new pipe 1 or a new metal sheet to be chamfered and is fixed by closely adhering the inscribing roller 50 to the pipe 1 or the new metal sheet, and the gear box 70 is coupled and fixed, thereby allowing the new pipe 1 or the new metal sheet to be chamfered.

According to the present invention, the chamfering apparatus 10 can automatically chamfer the pipe 1 while moving along the cutting surface of the pipe 1 by use of the rotational force of the motor 71, instead of being manually rotated to chamfer a pipe. Accordingly, the present invention can be effectively used for large-diameter pipes.

What is claimed is:

1. An automatic movable machine for chamfering a pipe and a metal sheet, characterized in that:
   a vertical plate, which is closely adhered to a cutting surface of a pipe or a metal sheet, and a support plate, which is closely adhered to the outside of the pipe or a top of the metal sheet, are fixed, in a perpendicular direction to each other, to a semicircular chamfering angle adjusting plate, which is installed in a head of a chamfering apparatus;
   a vertical fixing plate is installed at a front of the vertical plate and a horizontal fixing plate is installed at an end of the vertical fixing plate to face the inside of the pipe or a bottom of the metal sheet;
   a moving body with an inscribing roller installed therein is provided above the horizontal fixing plate and is installed so as to be vertically movable in response to an inscribing roller adjustment screw installed on the horizontal fixing plate being rotated, and thus to be closely adhered to the inside of the pipe or the bottom of the metal sheet;
   a fixing bolt is installed on the support plate, guides are installed on both sides of the fixing bolt, and the fixing bolt and the guides are inserted into holes formed on the fixing plate, which protrudes from, and is fixed at, the front of a gear box;
   once the fixing plate is engaged with the fixing bolt, a fixing nut is inserted and tightened;
   circumscribing rollers, which protrude forward from both sides of the gear box and are closely adhered to the outside of the pipe or the top of the metal sheet, are rotated by receiving a force decelerated from a force of a motor from at least one gear installed inside the gear box; and
   the rotation of the motor is selected with a control panel.

2. The automatic movable machine of claim 1, wherein the inscribing roller is installed in such a manner that an axial center thereof can be deviated from an axial center of the pipe and a right angle line of the metal sheet, and as a result, the vertical plate can be closely adhered to cutting surfaces of the pipe and the metal sheet when the chamfering apparatus moves forward.

* * * * *